(12) United States Patent
Ganzi et al.

(10) Patent No.: US 6,312,577 B1
(45) Date of Patent: Nov. 6, 2001

(54) CONTINUOUS ELECTRODEIONIZATION APPARATUS AND METHOD

(75) Inventors: Gary C. Ganzi, Lexington; Frederick Wilkins, Pepperell; Anthony J. Giuffrida, North Andover, all of MA (US)

(73) Assignee: United State Filter Corporation, Palm Desert, CA (US)

( * ) Notice: Subject to any disclaimer, the term of this patent is extended or adjusted under 35 U.S.C. 154(b) by 0 days.

(21) Appl. No.: 09/549,011

(22) Filed: Apr. 14, 2000

Related U.S. Application Data

(63) Continuation-in-part of application No. 09/240,420, filed on Jan. 29, 1999.

(51) Int. Cl.[7] .................................................. B01D 61/48
(52) U.S. Cl. ....................... 204/524; 204/533; 204/536; 204/632; 204/634
(58) Field of Search .................................. 204/524, 536, 204/533, 632, 634

(56) References Cited

U.S. PATENT DOCUMENTS

| | | |
|---|---|---|
| 2,514,415 | 7/1950 | Rasch . |
| 2,794,777 | 6/1957 | Pearson . |
| 2,815,320 | 12/1957 | Kollsman . |
| 2,923,674 | 2/1960 | Kressman . |

(List continued on next page.)

FOREIGN PATENT DOCUMENTS

| | | |
|---|---|---|
| 1044411A | 8/1990 | (CN) . |
| 1 201 055 | 9/1962 | (DE) . |
| 1201055 | 9/1965 | (DE) . |
| 44 18 812 | 12/1995 | (DE) . |
| 0 503 589 | 9/1992 | (EP) . |
| 0 680 932 | 11/1995 | (EP) . |
| 0 870 533 | 10/1998 | (EP) . |
| 776469 | 6/1957 | (GB) . |
| 1137679 | 12/1968 | (GB) . |
| 1448533 | 9/1976 | (GB) . |
| 47 49424 | 12/1972 | (JP) . |
| 52-71015 | 1/1979 | (JP) . |
| 54-5888 | 1/1979 | (JP) . |
| WO 92/11089 | 7/1992 | (WO) . |
| WO 95/32791 | 12/1995 | (WO) . |
| WO 97/46491 | 12/1997 | (WO) . |
| WO97/46492 | 12/1997 | (WO) . |
| WO 98/11987 | 3/1998 | (WO) . |
| WO 98/20972 | 5/1998 | (WO) . |

OTHER PUBLICATIONS

Glueckauf, Electro–Deionisation Through a Packed Bed, 12/59, pp. 646–651, British Chemical Engineering.

Matějka, Continous Production of High–Purity Water by Electro–Deionisation, 4/71, pp. 117–120, J. Appl. Chem., Biotechnol. vol. 21.

Walters et al., Concentration of Radioactive Aqueous Wastes, 1/55, pp. 61–67, Industrial and Engineering Chemistry.

(List continued on next page.)

*Primary Examiner*—Arun S. Phasge
(74) *Attorney, Agent, or Firm*—Wolf, Greenfield & Sacks, P.C.

(57) ABSTRACT

A continuous electrodeionization apparatus and method. The continuous electrodeionization apparatus and method provide improved removal of weakly ionized ions, particularly silica. The apparatus and method involves using macroporous ion exchange resins that are both highly crosslinked and have a high water content. In preferred embodiments, the ion exchange resin beads also have a substantially uniform diameter.

31 Claims, 5 Drawing Sheets

U.S. PATENT DOCUMENTS

| | | |
|---|---|---|
| 3,149,061 | 9/1964 | Parsi . |
| 3,291,713 | 12/1966 | Parsi . |
| 3,375,208 | 3/1968 | Duddy . |
| 3,686,089 | 8/1972 | Korngold . |
| 3,755,135 | 8/1973 | Johnson . |
| 3,869,376 | 3/1975 | Tejeda . |
| 3,876,565 | 4/1975 | Takashima et al. . |
| 3,989,615 | 11/1976 | Kiga et al. . |
| 4,032,452 | 6/1977 | Davis . |
| 4,033,850 | 7/1977 | Kedem et al. . |
| 4,089,758 | 5/1978 | McAloon . |
| 4,130,473 | 12/1978 | Eddleman . |
| 4,167,551 | 9/1979 | Tamura et al. . |
| 4,216,073 | 8/1980 | Goldstein . |
| 4,226,688 | 10/1980 | Kedem et al. . |
| 4,298,442 | 11/1981 | Giuffrida . |
| 4,430,226 | 2/1984 | Hedge et al. . |
| 4,465,573 | 8/1984 | O'Hare . |
| 4,473,450 | 9/1984 | Nayak et al. . |
| 4,505,797 | 3/1985 | Hodgdon et al. . |
| 4,632,745 | 12/1986 | Giuffrida et al. . |
| 4,636,296 | 1/1987 | Kunz . |
| 4,671,863 | 6/1987 | Tejeda . |
| 4,687,561 | 8/1987 | Kunz . |
| 4,707,240 | 11/1987 | Parsi et al. . |
| 4,747,929 | 5/1988 | Siu et al. . |
| 4,747,955 | 5/1988 | Kunin . |
| 4,753,681 | 6/1988 | Giuffrida et al. . |
| 4,804,451 | 2/1989 | Palmer . |
| 4,925,541 | 5/1990 | Giuffrida et al. . |
| 4,931,160 | 6/1990 | Giuffrida . |
| 4,956,071 | 9/1990 | Giuffrida et al. . |
| 4,983,267 | 1/1991 | Moeglich et al. . |
| 5,026,465 | 6/1991 | Katz et al. . |
| 5,066,375 | 11/1991 | Parsi et al. . |
| 5,084,148 | 1/1992 | Kazcur et al. . |
| 5,092,970 | 3/1992 | Kaczur et al. . |
| 5,106,465 | 4/1992 | Kaczur et al. . |
| 5,116,509 | 5/1992 | White . |
| 5,120,416 | 6/1992 | Parsi et al. . |
| 5,154,809 | 10/1992 | Oren et al. . |
| 5,196,115 | 3/1993 | Andelman . |
| 5,203,976 | 4/1993 | Parsi et al. . |
| 5,211,823 | 5/1993 | Giuffrida et al. . |
| 5,223,103 | 6/1993 | Kazcur et al. . |
| 5,240,579 | 8/1993 | Kedem . |
| 5,254,227 | 10/1993 | Cawlfield et al. . |
| 5,292,422 | 3/1994 | Liang et al. . |
| 5,308,466 | 5/1994 | Ganzi et al. . |
| 5,316,637 | 5/1994 | Ganzi et al. . |
| 5,346,624 | 9/1994 | Libutti et al. . |
| 5,356,849 | 10/1994 | Matviya et al. . |
| 5,376,253 | 12/1994 | Rychen et al. . |
| 5,434,020 | 7/1995 | Cooper . |
| 5,444,031 | 8/1995 | Hayden . |
| 5,451,309 | 9/1995 | Bell . |
| 5,458,787 | 10/1995 | Rosin et al. . |
| 5,460,725 | 10/1995 | Stringfield . |
| 5,460,728 | 10/1995 | Klomp et al. . |
| 5,489,370 | 2/1996 | Lomasney et al. . |
| 5,503,729 | 4/1996 | Batchelder et al. . |
| 5,518,626 | 5/1996 | Birbara et al. . |
| 5,518,627 | 5/1996 | Tomoi et al. . |
| 5,538,611 | 7/1996 | Otowa . |
| 5,538,655 | 7/1996 | Fauteux et al. . |
| 5,593,563 | 1/1997 | Denoncourt et al. . |
| 5,679,228 | 10/1997 | Batchelder et al. . |
| 5,679,229 | 10/1997 | Goldstein et al. . |
| 5,858,191 | 1/1999 | DiMascio et al. . |
| 5,868,915 | 2/1999 | Ganzi et al. . |
| 5,891,328 | 4/1999 | Goldstein . |

OTHER PUBLICATIONS

Warshawksy et al., Themally Regenerable Polymerable Polymeric Crown Ethers, II Synthesis and Application In Electrodialysis, pp. 579–584 No date.

Kedem et al., EDS—Sealed Cell Electrodialysis, 1983, pp. 291–299, Desalination 46 No month.

International Search Report PCT/US97/17190, dated, Jan. 15, 1998.

International Search Report PCT/US97/17189, dated Jan. 15, 1998.

International Search Report PCT/US93/08745, dated Dec. 30, 1993.

International Search Report PCT/US00/01666, dated Jun. 13, 2000.

Capacitive Deionization of $NH_4ClO_0$ Solutions With Carbon Aerogel Electrodes, Farmer et al., J. Appl. Electro––Chemistry, 26 (1996), pp. 1007–1018 No month.

Johnson et al., Desalting by Means of Porous Carbon Electrodes, 3/71, pp. 510–217, Electrochemical Technology vol. 118, No. 3.

G.J. Gittens et al., Some Experimental Studies of Electrodeionization Through Resin Packed Beds, 3/64, Harwell, Chemistry Div., U.K.A.E.A. Research Group, Atomic Energy Research Establishment.

Simons, Electric Field Effects on Proton Transfer Between Ionizable Groups and Water in Ion Exchange Membranes, 1984, pp. 151–158, Electrochemical Technology No month.

Simons, Nature, vol. 280, Strong Electric Field Effects on Proton Transfer Between Membrane–Bound Amines and Water, Aug. 30, 1979, pp. 824–826.

Simons, Water Splitting in Ion Exchange Membranes, 1985, pp. 275–282, Pergamon Press Ltd. No month.

Purolite Technical Bulletin, Hypersol–Macronet ™ Sorbent Resins, 1995 No month.

Simons, The Origin and Elimination of Water Splitting in Ion Exchange Membranes During Water Demineralisation By Electrodialysis, Jan. 29, 1979, pp. 41–42, Desalination, 28.

DiMascio et al., Electrodiaresis Polishing (An Electrochemical Deionization Process), pp. 164–172 No date.

Dow Chemical Bulletin, DOWEX 11 Type Anion Resin No date.

Dow Chemical Bulletin, DOWEX Marathon C Cation Resin Desalination, 16 No date.

Kedem et al., Reduction of Polarization by Ion–Conduction Spacers: Theoretical Evaluation of a Model System, 1978, pp. 143–156, Desalination, 27 No month.

Farmer et al., Capacitive Deionization With Carbon Aerogel Electrodes, Strategic Environmental Research and Development Program SERDP Project No. 436–94 No date.

Hobro et al., Recycling of Chromium from Metal Finishing Waste Waters Using Electrochemical Ion Exchange (EIX) pp. 173–184, 1994 No month.

Shaposhnik et al., Demineralization of Water by Electrodialysis With Ion–Exchanger Packing Between the Membranes Jul. 12, 1971, pp. 2815–2818, Voronezh Technoligical Institute.

Sammon et al., An Experimental Study of Electrodeionisation and Its Application to the Treatment of Radioactive Wastes, 6/60, Chemistry Division, U.K.A.E.A. Research Group, Atomic Energy Research Establishment, Harwell.

CONTINUOUS ELECTRODEIONIZATION APPARATUS AND METHOD

This application is a continuation-in-part of U.S. application Ser. No. 09/240,420, filed Jan. 29, 1999, titled "Electrodeionization Apparatus and Method," now allowed.

BACKGROUND OF THE INVENTION

1. Field of the Invention

The present invention relates to a continuous electrodeionization apparatus and method and, more particularly, to a continuous electrodeionization apparatus and method that provide improved removal of weakly ionized ions such as silica, and enhanced overall performance.

2. Description of the Related Art

Electrodeionization (EDI) is a process that removes ionizable species from liquids using electrically active media and an electrical potential to influence ion transport. The electrically active media may function to alternately collect and discharge ionizable species, or to facilitate the transport of ions continuously by ionic or electronic substitution mechanisms. EDI devices include media of permanent or temporary charge, and may be operated to cause electrochemical reactions specifically designed to achieve or enhance performance. These devices also include electrically active membranes such as semipermeable ion exchange or bipolar membranes.

Continuous electrodeionization (CEDI) is a process wherein the primary sizing parameter is the transport through the media, not the ionic capacity of the media. A typical CEDI device includes alternating electroactive semipermeable anion and cation exchange membranes. The spaces between the membranes are configured to create liquid flow compartments with inlets and outlets. A transverse DC electrical field is imposed by an external power source using electrodes at the bounds of the membranes and compartments. Often, electrolyte compartments are provided so that reaction product from the electrodes can be separated from the other flow compartments. Upon imposition of the electric field, ions in the liquid are attracted to their respective counterelectrodes. The compartments bounded by the electroactive anion permeable membrane facing the anode and the electroactive cation membrane facing the cathode become ionically depleted, and the compartments bounded by the electroactive cation permeable membrane facing the cathode and the electroactive anion membrane facing the anode become ionically concentrated. The volume within the ion-depleting compartments and, in some embodiments, within the ion-concentrating compartments, also includes electrically active media. In CEDI devices, the media may include intimately mixed anion and cation exchange resins. The ion-exchange media enhances the transport of ions within the compartments and can also participate as a substrate for controlled electrochemical reactions.

The removal of weakly ionized ions, such as silica, using electrodeionization has been the subject of much research. Compared with other materials commonly found in water, silica is typically present only in trace amounts. However, its removal is important in the production of high purity water, wherein every trace constituent present in the feed water must be removed. It is well known that systems such as electrodialysis do not remove silica and that electrodeionization and electroregeneration techniques do not completely remove silica. The inability to adequately remove silica from a feed water stream thus greatly reduces the applicability of the above techniques in high purity applications, including the largest high purity application, boiler feed water.

Silica is weakly ionized and is not transported efficiently by ion exchange resins within the compartments or through the membranes of an electrodeionization device. It has been found that resins having a substantially uniform bead diameter allow substantially complete removal of weakly ionized carbonic acid from a feed stream, but do not improve silica removal to the same extent. However, when CEDI is operated at high voltage and/or low flow rates, the resin can pick up silica. The silica must be in ionic form on the resin and must therefore have transferred successfully through what is known in the art as the "film boundary layer barrier." Even in these cases, however, total transfer does not occur.

Researchers have suggested pH adjustments of the water to a more basic form to ionize silica and enhance its removal from feed water. However, such pH adjustments have been found to have only a moderate affect on silica removal. Instead of removing silica, the equipment rapidly removes the hydroxide ion that was added during pH adjustment and leaves the silica behind. In addition, attempts to remove silica by bipolar electroregeneration of resin have resulted in incomplete removal.

Ganzi et al., in U.S. Pat. No. 5,316,637, disclose an apparatus and method for removing weakly ionized ions from feed water. It is generally thought that the electrochemical removal of the weakly ionized silica requires an anion exchange resin material that contains a relatively low degree of crosslinking and/or relatively high water content, as well as a substantially uniform bead size. However, these materials tend to have expansion, small bead size, high-pressure loss, and reduced chemical and oxidation resistance.

Highly crosslinked resins typically provide poor silica removal because they are poor in transporting silica. Macroporous ion exchange resins are typically relatively highly crosslinked and typically contain relatively low water content. However, the characteristics of high crosslinking and low water content contribute to high electrical resistivity in a CEDI apparatus, especially in high purity water applications.

SUMMARY OF THE INVENTION

The present invention is directed to a continuous electrodeionization apparatus, including an ion-depleting compartment. The ion-depleting compartment includes a macroporous ion exchange resin having a water content of greater than about 40% and a degree of crosslinking of greater than about 4%. In another embodiment, the macroporous ion exchange resin has a substantially uniform diameter.

Another aspect of the invention is directed to a method for removing silica from water containing silica. The method involves providing a continuous electrodeionization apparatus having an ion-depleting compartment and positioning a macroporous ion exchange resin in the ion-depleting compartment. The macroporous ion exchange resin has a water content of greater than about 40% and a degree of crosslinking of greater than about 4%. The water containing silica is passed through the ion-depleting compartment, and an electric field is applied across the apparatus.

BRIEF DESCRIPTION OF THE DRAWINGS

Preferred, non-limiting embodiments of the present invention will be described by way of example with reference to the accompanying drawings, in which.

DETAILED DESCRIPTION OF THE INVENTION

Figure 1:
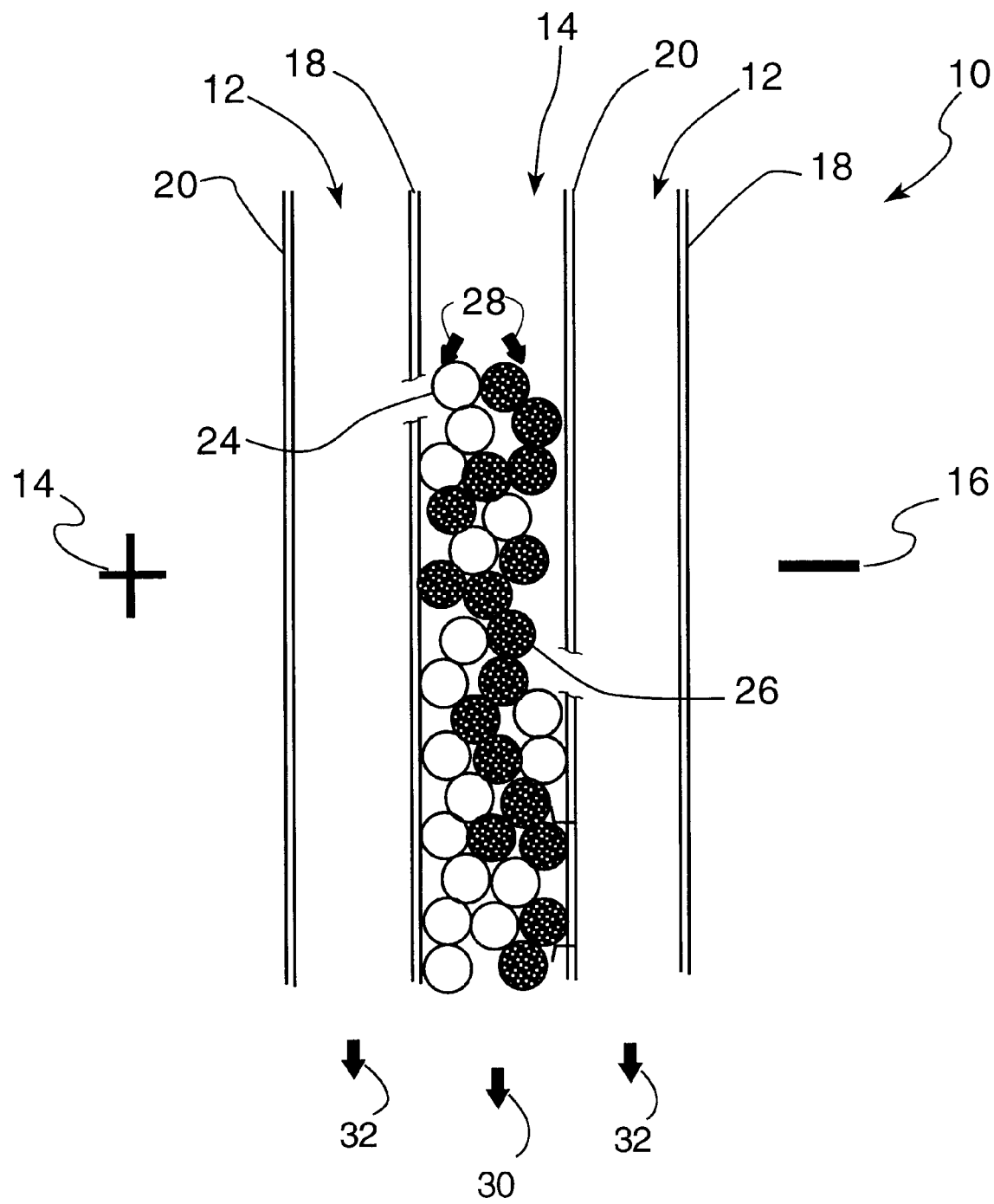
FIG. 1 is a cross-sectional illustration of a CEDI apparatus according to one embodiment of the present invention, in which the ion-depleting compartment is filled with a mixture of macroporous anion exchange resin beads and macroporous cation exchange resin beads.

The present invention is directed to a continuous electrodeionization (CEDI) apparatus and method that provide improved removal of weakly ionized ions such as silica. The present CEDI apparatus and method provide excellent silica removal. For purposes of the present invention, the CEDI apparatus is substantially similar in structure to those disclosed by Ganzi et al., in U.S. Pat. No. 4,632,745, which is incorporated herein by reference in its entirety. In addition, the CEDI apparatus may be based on various configurations, such as a spiral design, a plate and frame design, and a circular design.

The present invention is directed to a CEDI apparatus that includes an ion-depleting compartment, in which a macroporous ion exchange resin having a water content of greater than about 40% and a degree of crosslinking of greater than about 4% is positioned. In another embodiment, the macroporous ion exchange resin has a substantially uniform diameter. For the purposes of the present invention, it is noted that "macroporous ion exchange resins" are highly cross-linked and contain a high percentage of water.

According to the invention, the CEDI apparatus and method include macroporous ion exchange resins in the ion-depleting compartment, and, in some embodiments, in the ion-concentrating compartment. It has been found that certain types of macroporous ion exchange resins are effective for providing high product water resistivity. In addition, it has been found that such macroporous ion exchange resins are effective in removing at least 95% of silica from water containing silica. In addition, it has been found that such macroporous ion exchange resin beads provide unexpectedly combined low-pressure drop and electrical resistivity in comparison to other types of ion exchange resins. The macroporous ion exchange resins also have an unexpected catalytic effect on water splitting for electroregeneration. The macroporous ion exchange resins also provide increased chemical and temperature resistance, reduced organic fouling, and reduced bed expansion. In addition, the macroporous ion exchange resins provide improved resistance to oxidation by, for example, chlorine or chloramines.

One type of macroporous ion exchange resin that provides the aforementioned advantages has both a relatively high degree of crosslinking and contains a relatively high water content. As used herein, "relatively high water content," means water content of at least 40 percent. Preferably, such macroporous ion exchange resins have a relatively high surface area. As used herein, "relatively high surface area," means a surface area of at least about 15 $m^2/cm$. Such macroporous ion exchange resins are also preferably substantially uniform and, therefore, provide relatively lower pressure drop in the CEDI device, as well as more uniform current distribution, as disclosed by Oren et al. in U.S. Pat. No. 5,154,809, which is incorporated herein by reference in its entirety. As used herein, "substantially uniform," means that 90 percent of the beads are within +/−10 percent of the mean bead size, and that the relative average size of one ionic form of beads to a second ionic form of beads in a mixture of beads is at least 0.8. In preferred embodiments, the surface area of the macroporous ion exchange resin is preferably greater than about 15 $m^2/g$, more preferably greater than about 20 $m^2/g$, and even preferably greater than about 25 $m^2/g$. Also in the present embodiment, such macroporous ion exchange resins preferably have a degree of crosslinking of at least about 4 percent, more preferably at least about 5 percent, and even more preferably at least about 6 percent. Also in the present embodiment, the water content of such macroporous ion exchange resins is preferably at least about 40 percent, more preferably at least about 50 percent, and even more preferably at least about 60 percent. In the present embodiment, the mean resin size is at least about 500 microns, more preferably at least about 550 microns, and more preferably still at least about 600 microns.

A set of preferred embodiments will include all of the above features. That is, a preferred embodiment will include a surface area of greater than about 15 $m^2/g$, a degree of crosslinking of at least about 4 percent, a water content of at least about 40 percent, and substantially uniform resin size of at least about 500 microns; a more preferred embodiment will include a surface area of greater than about 20 $m^2/g$, a degree of crosslinking of at least about 5 percent, a water content of at least about 50 percent, and substantially uniform resin size of at least about 550 microns.

As described above, when the macroporous ion exchange resins described above are used in a CEDI apparatus, the pressure drop in the device is unexpectedly low in comparison to CEDI devices using other ion exchange resin materials. Generally, an increase in the pressure drop of a device is observed when the ion exchange materials swells, or expands, and the amount of water that can pass through the device decreases. Therefore, minimizing the amount of swelling or expansion may provide a reduction in pressure drop in a device. It has been found that maximizing any of the degree of crosslinking or the size of the macroporous ion exchange resins provides a reduction in pressure drop. Combining higher water content, higher degree of crosslinking, and larger bead sizes may provide even greater reductions in the pressure drop. As the water content of the resins increase, the amount of water that the resin can absorb is limited. Therefore, the amount of swelling due to the absorption of water is reduced. Similarly, as degree of crosslinking increases, the amount of expansion and contraction of the macroporous ion exchange resin decreases. Finally, larger resins become more loosely packed than smaller resins, the volume available for water to flow through the compartment increases with resin size, and the pressure drop in a device decreases when the flow path of water increases. Therefore, each of these features contributes to a reduction in pressure drop in the device by reducing in the amount of swelling or expansion of the macroporous ion exchange resin or by maximizing the amount of water that can pass through the device.

It is believed that one mechanism for this combination of properties occurs because of the lower pressure drop among the resin beads between the membranes. The lower pressure drop causes a higher fraction of the water to flow between the beads, rather than bypassing the beads and flowing along the walls of the resin compartments.

One commercially available type of macroporous ion exchange resin useful in the present invention is the DOWEX™ MARATHON™ MSA and MSC series anion and cation exchange resins (available from Dow Chemical Co., Midland, Mich.). The MARATHON™ MSA anion exchange resin is a high capacity, macroporous Type I strong base anion exchange resin having quaternary functional groups. The MARATHON™ MSC cation exchange resin is a high capacity macroporous strong acid cation exchange resin having sulfonic acid functional groups. Both the MSA and MSC ion exchange resins are characterized by a high degree of crosslinking, relatively high water content, and substantially uniform bead size, and are therefore advantageous for removing silica while providing high resistivity product water and low pressure drops in CEDI applications. The MARATHON™ MSA anion exchange resin has a degree of crosslinking ranging from about 4 percent to about 9 percent, and the MARATHONTM MSC cation exchange resin has a degree of crosslinking ranging from about 4 percent to about 14 percent. The MARATHON™ MSA anion exchange resin has a water content of about 56–66 percent, and the MARATHON™ MSC cation exchange resin has a water content of about 50–56 percent. The MARATHON™ MSA ion exchange resin has mean particle sizes ranging from 590 to 690 microns, and the MARATHON™ MSC ion exchange resin has mean particle sizes ranging from 450 to 570 microns.

FIG. 1 is a cross-sectional illustration of a portion of a CEDI apparatus 10 according to one embodiment of the present invention. The apparatus 10 includes ion-concentrating compartments 12 and an ion-depleting compartment 14 positioned between the ionconcentrating compartments 12. The ion-concentrating compartments 12 are bordered by an anode 14 and a cathode 16. Anion-permeable membranes 18 and cation-permeable membranes 20 are typically sealed to the periphery of both sides of the compartments, and spaced apart at least about ¹⁄₁₆ inch. In one preferred embodiment, the ion-permeable membranes are spaced apart at least about ¼ inch to about ½ inch, and in another preferred embodiment, the ion-permeable membranes are spaced apart at least about ¹⁄₁₆ inch to about ¼ inch.

In the present invention, mixtures of macroporous anion exchange resins 24 and macroporous cation exchange resins 26 are positioned in the ion-depleting compartment 14 in the space formed between the anion-permeable membranes 18 and cation-permeable membranes 20 to balance the transport properties of the resins according to their functional groups. The ion-depleting compartment 14 is preferably filled with a mixture of greater than or equal to about 50 percent by volume of the macroporous anion exchange resin and the balance by volume of the macroporous cation exchange resin; more preferably, greater than or equal to about 60 percent by volume of the macroporous anion exchange resin and the balance by volume of the macroporous cation exchange resin; even more preferably, greater than or equal to about 70 percent by volume of the macroporous anion exchange resin beads and the balance by volume of the macroporous cation exchange resin beads.

Figure 2:
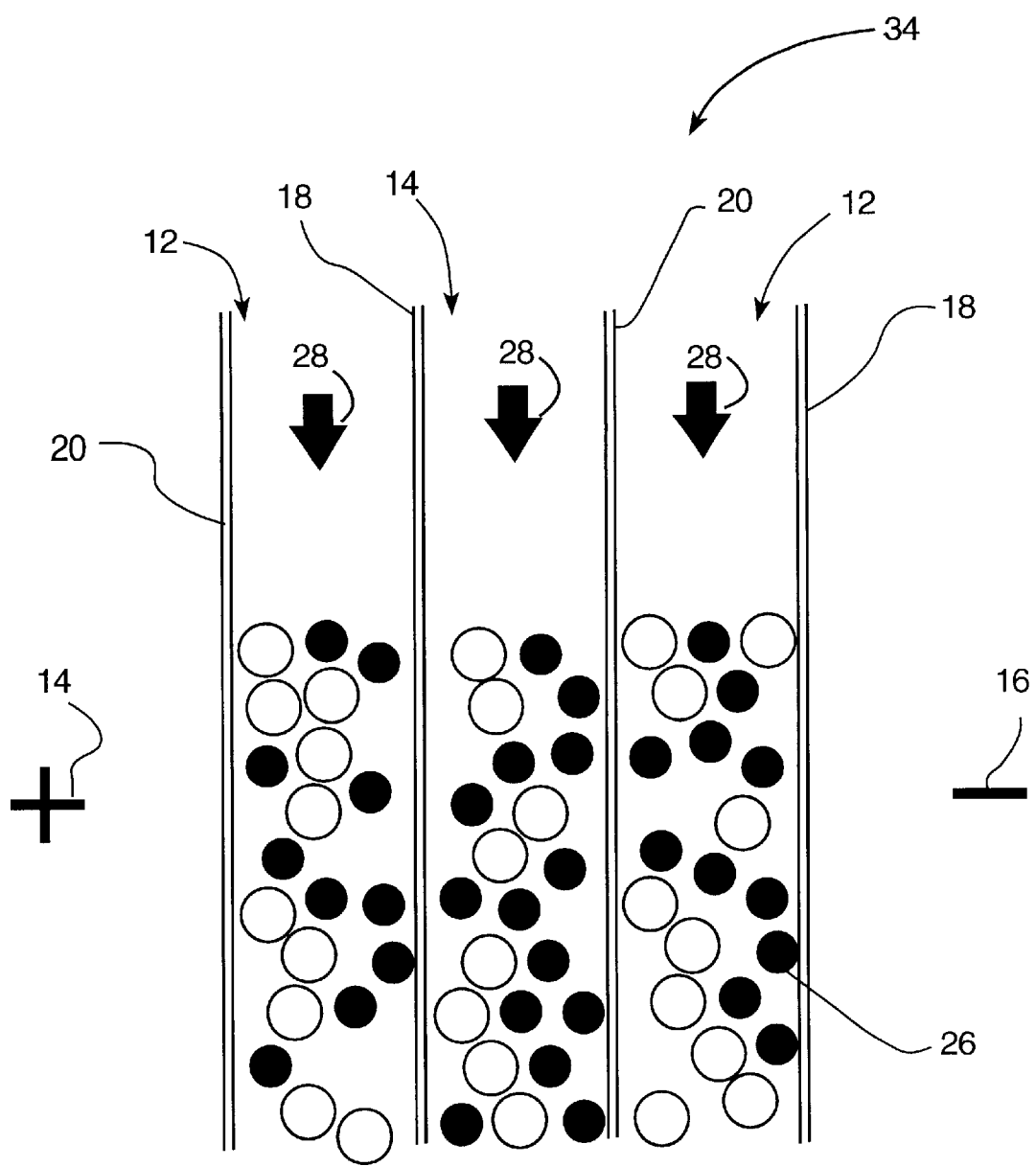
FIG. 2 is a cross-sectional illustration of a CEDI apparatus according to another embodiment of the present invention, in which the ion-depleting and ion-concentrating compartments are filled with a mixture of macroporous anion exchange resin beads and macroporous cation exchange resin beads.

Another embodiment of the invention is illustrated in FIG. 2, in which the apparatus 10 includes macroporous anion exchange resin 24 and macroporous cation exchange resin 26 positioned in both the ion-depleting compartments 14 and in the ion-concentrating compartments 16, in the spaces formed between the anion-permeable membranes 18 and cation-permeable membranes 20. In the present embodiment, both the ion-depleting compartment 14 and the ion-concentrating compartments are preferably filled with a mixture of the macroporous anion exchange resin and the macroporous cation exchange resin, in the same ratios described above with reference to the previous embodiment.

The macroporous anion exchange and macroporous cation exchange resins may also be useful in the formation of the anion- and cation-permeable membranes to provide high water content for increased silica removal, and high cross-linking for chlorine resistance.

It should also be noted that according to any of the disclosed embodiments, those of skill in the art will recognize that mixtures of the macroporous anion and cation exchange resins are not necessary to practice the invention, and that both the ion-depleting and ion-concentrating compartment may be filled with 100 percent of either macroporous anion or cation exchange resins, and that the macroporous anion and cation exchange resins may be positioned in alternating homogeneous or mixed layers therein.

Mixtures of macroporous anion exchange resins, either alone or mixed with a Type II or weak base anion exchange resin as a dopant, and non-macroporous cation exchange resins have also been shown to be effective when positioned in either or both of the ion-depleting compartments and in the ion-concentrating compartments. For example, it has been found that one particularly effective mixture utilizes MARATHON™ MSA series anion exchange resins and DOW™ MONOSPHERE™ 650C cation exchange resins positioned in either or both of the ion-depleting compartments and in the ion-concentrating compartments.

According to any of the embodiments disclosed herein, the method of operation involves feeding a liquid to be purified 28, which may be a reverse osmosis product stream, typically having dissolved cationic and anionic components, which may typically include weakly ionized ions such as silica, is fed through the ion-depleting compartment 14, wherein the anionic components are attracted to the anion exchange resin 24 and the cationic components are attracted to the cation exchange resin beads 26. A DC electric field is then applied across the anode 14 and cathode 16 at the opposite ends of the module. The electric current passes perpendicularly to the fluid flow such that the dissolved cationic and anionic components migrate from the ion exchange resins in the direction of their corresponding electrode. Cationic components migrate through the cation-permeable membrane 20 into the adjacent ion-concentrating compartment 12. The anion-permeable membrane on the opposite side of the ion-concentrating compartment prevents further migration, thereby trapping the cationic components in the ion-concentrating compartment. The process for the anionic components is similar but occurs in the opposite direction; anionic components migrate through the anion-permeable membrane 18 into the ion-concentrating compartment 12 and a cation-permeable membrane 20 on the other side of the ion-concentrating compartment prevents further migration to trap the anionic components in the ion-concentrating compartment. Ionic components are depleted from the ion-depleting compartment 14 and increase in the ion-concentrating compartments 12, forming a high purity product stream 30 and a concentrate stream 32.

At specific intervals up to the maximum voltage of 22 V, the DC current, current efficiency, and salt removal were measured, as shown below in Table 1.

TABLE 1

| Anion Resin | | DC Voltage | 10 | 14 | 18 | 22 |
|---|---|---|---|---|---|---|
| DOWEX ™ MAX3 | DOWEX ™ A2 | DC Current (V) | 1.03 | 1.31 | 1.62 | 1.86 |
| | | Current Efficiency (%) | 84.3 | 92.12 | 59.9 | 55.1 |
| | | Salt Removal (%) | 83.5 | 91.1 | 93.2 | 94.1 |
| | | Module Resistance (ohms) | — | — | — | 10.7 |
| MARATHON ™ A | MARATHON ™ C | DC Current (V) | 0.97 | 1.18 | 1.35 | 1.63 |
| | | Current Efficiency (%) | 88.3 | 81.4 | 74.2 | 62.7 |
| | | Salt Removal (%) | 82.2 | 92.1 | 96.1 | 98.1 |
| | | Module Resistance (ohms) | — | — | — | 13.5 |
| MARATHON ™ MSA | MARATHON ™ MSC | DC Current (V) | 1.05 | 1.36 | 1.74 | 2.33 |
| | | Current Efficiency | 87.6 | 72.8 | 58.9 | 44.1 |
| | | Salt Removal | 89.3 | 97.1 | 98.3 | 99.0 |
| | | Module Resistance (ohms) | — | — | — | 9.4 |

In preferred embodiment, the method is useful for removing at least about 95%, more preferably at least about 98%, and even more preferably at least about 99%, of the silica from the feed water. Also in preferred embodiments, the method may be useful for providing product water having a resistivity of at least 15 megohms-cm, more preferably at least 16 megohms-cm, and even more preferably at least 17 megohms-cm. Especially when macroporous ion exchange resins have a substantially uniform diameter are used, the method may be useful maintaining a low-pressure drop in the apparatus.

A set of preferred embodiments of the method will provide all of the above-preferred features. For example, a preferred method will remove at least about 95% of the silica from the feed water, provide product water having a resistivity of at least 15 megohms-cm, and maintain a low pressure drop in the apparatus; a more preferred method will remove at least about 98% of the silica from the feed water, provide product water having a resistivity of at least 16 megohms-cm, and maintain a low pressure drop in the apparatus.

The CEDI devices according to any embodiment disclosed herein may be operated under conditions of chemical solute, or temperature cycling, and/or electrical field polarity cycling or reversal, as described by Ganzi et al., in U.S. Pat. No. 5,868,915, which is incorporated herein by reference in its entirety.

EXAMPLES

The present invention will be further illustrated by the following examples, which are intended to be illustrative in nature and are not to be considered as limiting the scope of the invention.

Example 1

The following examples were performed in a 4 cell pair compact hot melt module to determine the effectiveness of the MARATHON™ MSA and MSC series anion and cation exchange resins on current efficiency and salt removal. A 200 ppm sodium chloride solution, having a conductivity of about 400 $\mu$S/cm and a flow rate of 200 ml/min per cell at a temperature of between about 20° C. to about 22° C., was used as the feed in each example.

As shown in Table 1, at the maximum module voltage of 22V, the MARATHON™ MSA/MSC combination achieved 99 percent salt removal, compared to 98% removal for the MARATHON™ A/C, and 94% removal for the DOWEX™ MAX3/DOWEX™ A2 combination (both available from Dow Chemical Co., Midland, Mich.), while operating at the lowest voltage of the three combinations. Moreover, the MARATHON™ MSA/MSC combination achieved the lowest module resistance at 9.4 ohms, in comparison to 13.5 ohms for the MARATHON™ A/C combination, and 10.7 ohms for the MAX3/A2 combination. In addition, the MARATHON™ MSA/MSC combination provided lower current efficiency than the other two combinations at all voltages.

Example 2

The following comparative examples were performed in a 5 cell pair compact welded CEDI module to determine the effect of the amount of crosslinking, the water content, and the bead diameter on pressure drop. A feed solution having a conductivity of about 5.39–10.4 $\mu$S/cm, at a temperature of between about 14.5° C. and about 15.5° C., was used in each example.

The ion-depleting and ion-concentrating compartments were filled with a 70/30 mixture, by volume, of the anion/cation mixtures listed below in Table 2. The electrode compartments were filled with MONOSPHERE™ 650 cation exchange resin.

TABLE 2

| Anion Resin | Mean Bead Diameter (um) | Cation Resin | Mean Bead Diameter (um) | Δ P at 0.5 lpm | Δ P at 1.0 lpm | Δ P at 1.5 lpm | Δ P at 1.8 lpm |
|---|---|---|---|---|---|---|---|
| MARATHON™ A | | MARATHON™ C | | 4.0 | 9.5 | 16.2 | 19.7 |
| DOWEX 11 | | AMBERJET 1200 | | 2.5 | 6.5 | 10.5 | 14.8 |
| MARATHON™ MSA | 640 | MARATHON™ MSC | 510 | 2.1 | 6.0 | 9.4 | 13.6 |
| MARATHON™ MSA | 640 | AMBERJET 1200 | | 2.1 | 5.5 | 9.4 | 13.6 |

Figure 3:
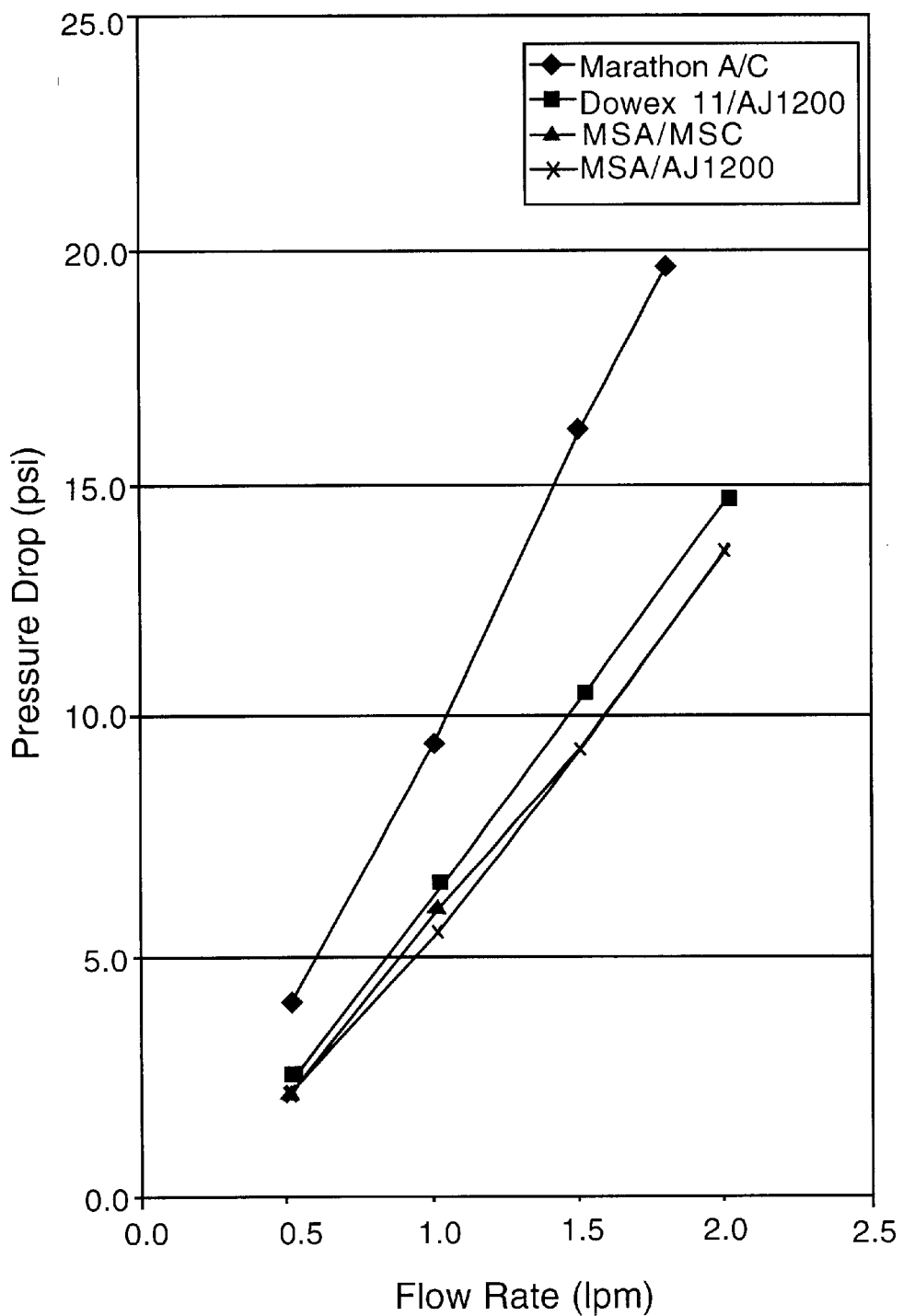
FIG. 3 is a graph of pressure drop (psi) versus flow rate (lpm) through a CEDI apparatus wherein mixtures of various types of anion and cation exchange resins are positioned in the ion-depleting and ion-concentrating compartments.

As shown in Table 2, and the graph of the data shown in FIG. 3, the pressure drop of the modules using the MARATHON™ MSA anion resin were similar at all measured flow rates, and substantially lower than those modules using with the MARATHON™ A or the DOWEX™ 11 anion resins (available from Dow Chemical Co., Midland, Mich.). The pressure drop across the module is improved in comparison to the MARATHON™ A or the DOWEX™ 11 anion resins, which have smaller beads, lower degree of crosslinking and lower water content.

Example 3

The following examples were performed in a compact hot melt welded CEDI module having 3 concentrating cells and 4 diluting cells, to determine the effectiveness of the MARATHON™ MSA and MSC series anion and cation exchange resins on silica removal and product water resistivity over an extended period of time. A continuous feed solution having a conductivity of about 6.0–9.0 μS/cm, at a temperature of between about 13.5° C. and about 15.5° C., was used in each example.

The ion-depleting and ion-concentrating chambers were each filled with a 70/30 mixture, by volume, of MARATHON™ MSA/MSC resin beads. A screen was used in the electrode compartments. The product resistivity and silica removal were measured periodically, and are listed below in Table 3.

TABLE 3

| Day | Product Resistivity (megohms-cm) | Silica Removal (%) |
|---|---|---|
| 1 | 16.9 | 98.13 |
| 2 | 17.0 | 99.34 |
| 3 | 17.0 | 96.67 |
| 4 | 17.1 | 97.47 |
| 5 | 17.3 | 98.69 |
| 8 | 17.4 | 98.89 |
| 9 | 17.6 | 98.34 |

As shown in Table 3, the product water resistivity was maintained in the range of between about 16.9–17.6 megohms-cm, and the silica removal was maintained in the range of between about 96.7 and 99.3 percent over a time period of about 9 days.

Example 4

The following examples were performed in a 5 cell pair compact welded CEDI module to determine the oxidation resistance of the MARATHON™ MSA and MSC series anion and cation exchange resins. A deterioration in the resistance of the resins is generally indicated a decrease in product resistivity. The ion-depleting and ion-concentrating chambers 70/30 mixture, by volume, of anion and cation exchange resin beads. The bead mixtures are listed below in Table 4. The electrode compartments were filled with DOW™ MONOSPHERE™ 650C (available from Dow Chemical Co., Midland, Mich.).

A continuous feed solution having a conductivity of about 15.1–17.4 μS/cm, at a temperature of between about 18.3° C. to about 20.6° C., was used in each example. With the exception of control Module #1, a sodium hypochlorite solution was continuously added to the feed after a period of 20 hours in order to provide free chlorine. The pressure drop in the ment and the product resistivity were then measured periodically over a period of about 180 hours.

TABLE 4

| Module | Anion Resin (70%) | Cation Resin (30%) |
|---|---|---|
| 1 | MARATHON™ MSA | MARATHON™ MSA |
| 2 | MONOSPHERE™ 550 A | MARATHON™ C |
| 3 | MARATHON™ A/ AMBERJET 4600 | MARATHON™ C |
| 4 | MARATHON™ A | MARATHON™ C |
| 5 | DOWEX™ 11 | AMBERJET 1200 |
| 6 | MARATHON™ MSA | MARATHON™ MSC |
| 7 | MARATHON™ MSA | AMBERJET 1200 |

Figure 4:
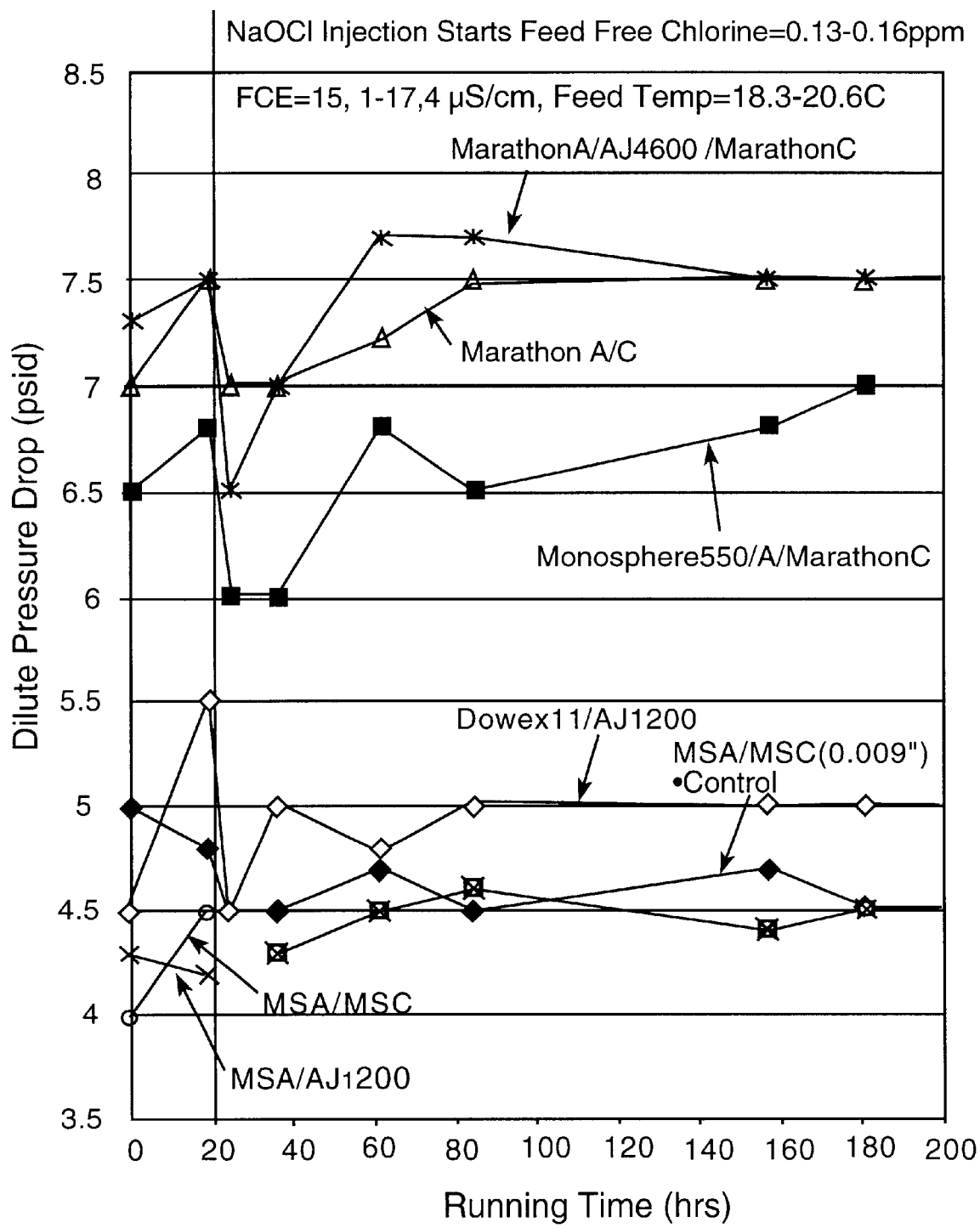
FIG. 4 is a graph of pressure drop (psid) as a function of time (hrs) through a CEDI apparatus wherein mixtures of various types of anion and cation exchange resins are positioned in the ion-depleting and ion-concentrating compartments.
Figure 5:
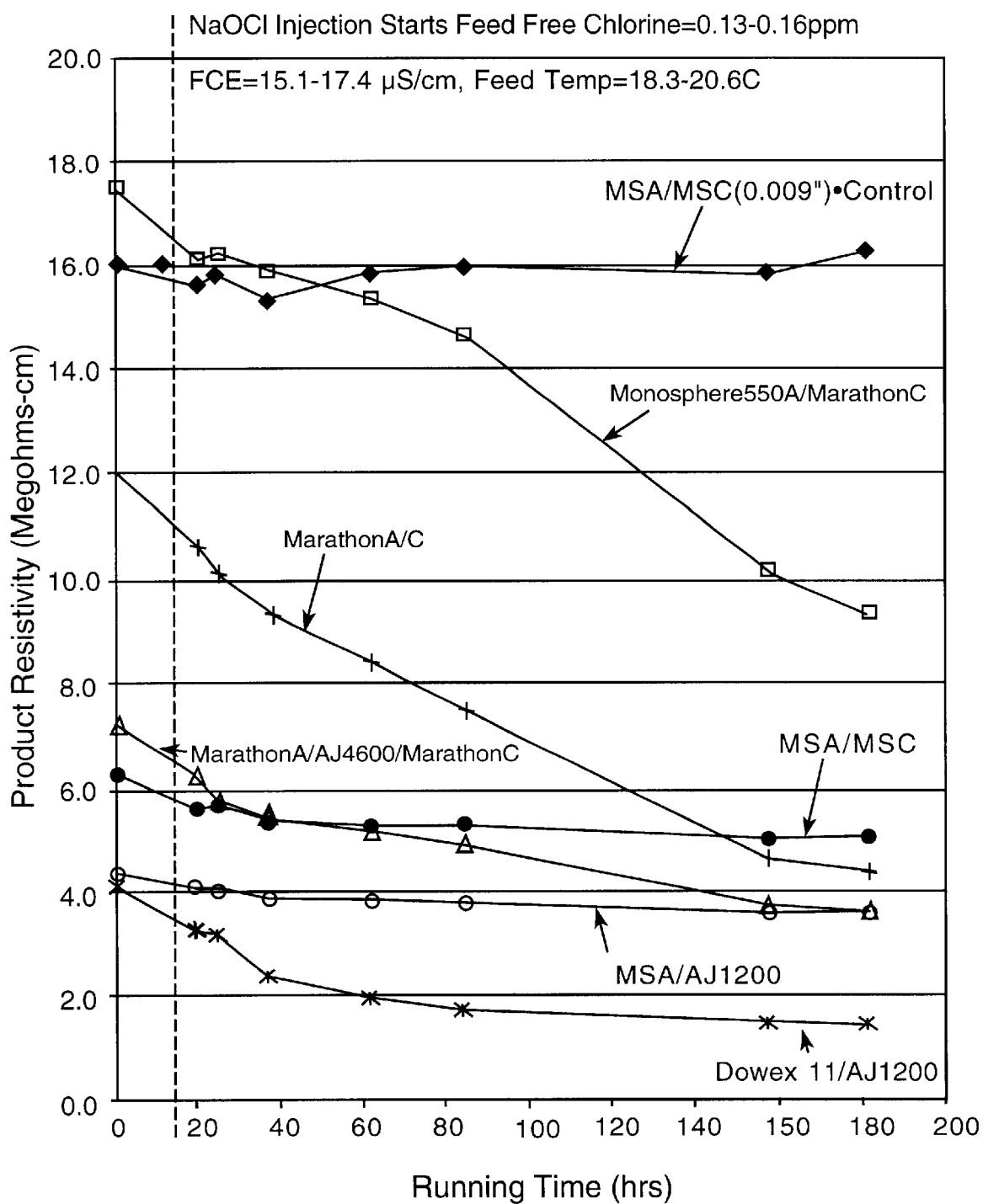
FIG. 5 is a graph of product resistivity (megohms-cm) as a function of time (hrs) through a CEDI apparatus wherein mixtures of various types of anion and cation exchange resins are positioned in the ion-depleting and ion-concentrating compartments.

As shown in FIG. 4, the pressure drop in the dilute compartment did not change significantly in any of the modules after 181 hours of run time. As shown in FIG. 5, moderate reductions in the product resistivity were observed in Modules 3 and 5, and substantial reductions in product resistivity were observed in Modules 2 and 4. The product resistivity of the Control Module 1, Module 6, and Module 7 varied little during the 181 hours of running time, showing the efficacy of the oxidation resistance of the MARATHON™ MSA resin.

Further modifications and equivalents of the invention herein disclosed will occur to persons skilled in the art using no more than routine experimentation, and all such modifications and equivalents are believed to be within the spirit and scope of the invention as defined by the following claims.

What is claimed is:

1. A continuous electrodeionization apparatus, comprising:
    an ion-depleting compartment comprising a macroporous ion exchange resin having a water content of greater than about 40% and a degree of crosslinking of greater than about 4%.

2. The continuous electrodeionization apparatus of claim 1, wherein the macroporous ion exchange resin has a substantially uniform diameter.

3. The continuous electrodeionization apparatus of claim 2, wherein the macroporous ion exchange resin has a surface area of greater than about 15 $m^2/g$.

4. The continuous electrodeionization apparatus of claim 3, wherein the macroporous ion exchange resin has a mean diameter of between about 500 μm and about 800 μm.

5. The continuous electrodeionization apparatus of claim 4, wherein the ion-depleting compartment includes a macroporous anion exchange resin.

6. The continuous electrodeionization apparatus of claim 5, wherein the ion-depleting compartment further includes a macroporous cation exchange resin.

7. The continuous electrodeionization apparatus of claim 5, wherein the ion-depleting compartment includes greater than or equal to about 50 percent by volume of the macroporous anion exchange resin.

8. The continuous electrodeionization apparatus of claim 5, wherein the ion-depleting compartment includes greater than or equal to about 60 percent by volume of the macroporous anion exchange resin.

9. The continuous electrodeionization apparatus of claim 5, wherein the ion-depleting compartment includes greater than or equal to about 70 percent by volume of the macroporous anion exchange resin.

10. The continuous electrodeionization apparatus of claim 1, wherein the ion-depleting compartment includes opposing ion-permeable membranes spaced apart at least about 1/16 inch.

11. The continuous electrodeionization apparatus of claim 10, wherein the ion-depleting compartment includes opposing ion-permeable membranes spaced apart at least about 1/4 inch to about 1/2 inch.

12. The continuous electrodeionization apparatus of claim 10, wherein the ion-depleting 10 compartment includes opposing ion-permeable membranes spaced apart at least about 1/16 inch to about 1/4 inch.

13. The continuous electrodeionization apparatus of any one of claims 1, 2, 3, 4, 5, 6, 7, and 10, wherein the ion-depleting compartment includes a mixture of macroporous anion exchange resin and macroporous cation exchange resin.

14. The continuous electrodeionization apparatus of any one of claims 1, 2, 3, 4, 5, 6, 7, and 10, wherein the ion-depleting compartment includes alternating layers of macroporous anion exchange resin and macroporous cation exchange resin.

15. The continuous electrodeionization apparatus of claim 1, further comprising an ion-concentrating compartment including the macroporous ion exchange resin.

16. The continuous electrodeionization apparatus of claim 15, wherein the ion-concentrating compartment includes a macroporous anion exchange resin and a macroporous cation exchange resin.

17. A continuous electrodeionization apparatus, comprising:
   an ion-depleting compartment comprising a macroporous ion exchange resin having a water content of greater than about 40%, and a degree of crosslinking of greater than about 4%;
   wherein the macroporous ion exchange resin has a substantially uniform diameter.

18. The continuous electrodeionization apparatus of claim 17, wherein the macroporous ion exchange resin has a mean diameter of at least about 450 $\mu$m.

19. The continuous electrodeionization apparatus of claim 18, wherein the macroporous ion exchange resin has a surface area of at least about 15 $m^2/g$.

20. The continuous electrodeionization apparatus of claim 19, wherein the ion-depleting compartment includes a macroporous anion exchange resin and a macroporous cation exchange resin.

21. The continuous electrodeionization apparatus of claim 20, wherein the ion-depleting compartment includes about 50 percent by volume of the macroporous anion exchange resin and about 50 percent by volume of the macroporous cation exchange resin.

22. The continuous electrodeionization apparatus of claim 20, wherein the ion-depleting compartment includes about 60 percent by volume of the macroporous anion exchange resin beads and about 40 percent by volume of the macroporous cation exchange resin beads.

23. The continuous electrodeionization apparatus of claim 20, wherein the ion-depleting compartment includes about 70 percent by volume of the macroporous anion exchange resin and about 30 percent by volume of the macroporous cation exchange resin.

24. A method for removing silica from water containing silica, comprising:
   providing a continuous electrodeionization apparatus having an ion-depleting compartment;
   positioning a macroporous ion exchange resin in the ion-depleting compartment, the macroporous ion exchange resin having a water content of greater than about 40% and a degree of crosslinking of greater than about 4%;
   passing the water containing silica through the ion-depleting compartment; and applying an electric field across the continuous electrodeionization apparatus.

25. The method of claim 24, wherein the macroporous ion exchange resin has a substantially uniform diameter.

26. The method of claim 25, further comprising removing at least about 95% of the silica from the water.

27. The method of claim 26, further comprising removing at least about 98% of the silica from the water.

28. The method of claim 27, further comprising removing at least about 99% of the silica from the water.

29. The method of claim 26, further comprising providing a product water having a resistivity of at least 15 megohms-cm.

30. The method of claim 27, further comprising providing a product water having a resistivity of at least 15 megohms-cm.

31. The method of claim 28, further comprising providing a product water having a resistivity of at least 15 megohms-cm.

* * * * *